United States Patent [19]

Weris, III

[11] 3,855,150
[45] Dec. 17, 1974

[54] STABILIZATION OF HYDROQUINONE SOLUTIONS WITH CITRIC ACID

[75] Inventor: Arthur P. Weris, III, Kingsport, Tenn.

[73] Assignee: Eastman Kodak Company, Rochester, N.Y.

[22] Filed: Mar. 26, 1973

[21] Appl. No.: 344,806

Related U.S. Application Data

[63] Continuation of Ser. No. 46,521, June 15, 1970, abandoned.

[52] U.S. Cl.............. 252/404, 252/407, 260/45.85, 260/621 R
[51] Int. Cl.......................... C07c 49/74, B01j 1/18
[58] Field of Search...... 252/404, 407, 45.85, 621 R

[56] References Cited
UNITED STATES PATENTS
2,607,745   8/1952   Magoffin............................ 252/404

Primary Examiner—Benjamin R. Padgett
Assistant Examiner—Irwin Gluck
Attorney, Agent, or Firm—John F. Stevens; Cecil D. Quillen, Jr.

[57]     ABSTRACT

Solutions of hydroquinone are stabilized against deterioration in color and odor with age by the addition to the solution of small amounts of citric acid. Up to about 1 percent citric acid by weight of the solution may be used, although it is preferred that this amount be between 0.005 percent and 0.05 percent.

5 Claims, No Drawings

STABILIZATION OF HYDROQUINONE SOLUTIONS WITH CITRIC ACID

This is a continuation, of application Ser. No. 46,521 filed June 15, 1970 and now abandoned.

This invention relates to the stabilization of solutions of hydroquinone. More specifically, this invention relates to the stabilization of hydroquinone against deterioration in color and odor with age while in solution.

Hydroquinone is commonly used as an inhibitor to prevent undesirable polymerization in unsaturated polyester resins. It is conventional practice to prepare stock solutions of the hydroquinone inhibitor in certain solvents such that the inhibitor can easily be added to the polyester resin. These solutions of hydroquinone are known to darken or discolor with age. It is most important that there be no change of color of the solution since this will result in undesirable color of the resin to which it is added.

Attempts have been made in the past to stabilize certain hydroquinone compositions. For example, both inorganic and organic reducing agents have been reported to be incapable of preventing color changes in hydroquinone compositions. Furthermore, aldehyde sugars and reducing organic substances such as citric acid have been reported unsatisfactory in preventing color changes in certain hydroquinone compositions.

It is known in the art that citric acid stabilizes certain alkyl substituted monohydric phenols, especially polyalkyl monohydric phenols. Hydroquinone is susceptible to oxidation, forming a quinone. In the case of substituted alkyl phenols, oxidation usually occurs on a substituent rather than on the phenolic ring itself. Thus, a different problem exists when attempting to stabilize the hydroquinone than when attempting to stabilize a substituted phenol.

It is therefore an object of this invention to provide a stabilizer for hydroquinone solutions useful in inhibiting undesirable polymerization of unsaturated polyesters.

It is a further object of this invention to provide a stabilizer for hydroquinone solutions which will have no adverse effect on the eventual curing of the unsaturated polyester resin.

Another object of this invention is to provide a stabilizer for hydroquinone solutions which will add no odor to the solution.

A further object of this invention is to provide a stabilizer for hydroquinone solutions which is simple and easy to use.

It has now been discovered that hydroquinone may be stabilized while in solution against undesirable color and odor formation by the addition to the solution of small amounts of citric acid. As a result of this treatment, it is possible to make solutions of hydroquinone in various solvents that will not discolor or acquire undesirable odor upon standing. The citric acid may be added to the hydroquinone before or after it is put into solution.

Typical solvents which may be used to make solutions of the hydroquinone for use as inhibitors for unsaturated polyesters include ethylene gylcol, diethylene glycol, and methoxyethanol. These solutions may contain hydroquinone in amounts of 10–15 percent by weight.

Concentrations of the citric acid may range from between about 0.0025 percent to 1 percent by weight, based on the total weight of the solution containing the hydroquinone. It is preferred, however, that the concentration be within a range of from about 0.005 percent to about 0.05 percent by weight, based on the total weight of the solution.

The following examples are included for a better understanding of the invention.

EXAMPLE 1

Four solutions of hydroquinone in diethylene glycol are prepared by dissolving 15 g. of hydroquinone in 85 g. of diethylene glycol. Three of these solutions are stabilized with 25, 100 and 500 ppm, respectively, of citric acid. The samples are stored in 8 oz. glass jars at room temperature for 30 days, and visually observed daily for discoloration. After 30 days, only the sample which did not contain citric acid had darkened.

A commercially produced 1:1 phthalic anhydride/maleic anhydride:propylene glycol unsaturated polyester resin is mixed with styrene monomer in the ratio of 60 percent styrene to 40 percent polyester and inhibited with 100 ppm of hydroquinone from the above stock solution which contained 100 ppm of citric acid. A standard 180°F. SPL gel test was run on this sample and a similar sample inhibited with 100 ppm hydroquinone, but no citric acid. The results of these tests are given in Table 1. It can be seen that there is no significant difference in the results obtained from the samples both containing and not containing citric acid.

EXAMPLE 2

Four solutions of hydroquinone in methoxyethanol are prepared as in Example 1. After 30 days storage, only the sample which did not contain citric acid darkens.

Standard 180°F. gel tests are performed on an unsaturated polyester sample inhibited with 100 treated hydroquinone from the citric acid trated solution. The test is also run on a similar sample inhibited with hydroquinone, but containing no citric acid. The results of this test are given in Table I. It can be seen that there is no significant difference in the results obtained from the samples both containing and not containing citric acid.

The Table which follows illustrates the effect of the citric acid on the cure properties of unsaturated polyesters.

It has surprisingly been found that citric acid has the ability to stabilize hydroquinone solutions in such solvents as diethylene glycol and methoxythanol for periods of at least 2 months, while such solutions containing other acids such as fumaric, salicyclic, benzoic and adipic acid darken in periods ranging from 2–6 days. Furthermore, since citric acid is a white solid, it is convenient to add to hydroquinone, which is also a white solid. In the small amounts that are used according to this invention, the citric acid has no adverse effect on the eventual curing of the unsaturated polyester resin.

TABLE 1

EFFECT OF CITRIC ACID ON THE CURE PROPERTIES of UNSATURATED POLYESTERS[1]

| Solvent[2] | Citric Acid[3] | Gel Time (Min.)[4] | Time to Peak Exotherm (Min.) | Peak Exotherm Temp. (°F.) |
|---|---|---|---|---|
| Diethylene glycol | percent | 3.5 | 6.3 | 412 |
| Diethylene glycol | Yes | 3.7 | 6.5 | 416 |
| Methoxyethanol | — | 3.7 | 6.5 | 419 |
| Methoxyethanol | Yes | 3.7 | 6.6 | 420 |

[1] 40% Styrene blend of a 1:1 phthalic anhydride/maleic anhydride: polypropylene glycol polyester resin.
[2] Solvent containing hydroquinone is added to the resin such that the hydroquinone concentration in the resin is 100 ppm.
[3] Citric acid concentration in the solvent was 100 ppm; citric acid is added to prevent discoloration of the stock solution.
[4] Standard 180° F. SPI Gel Test.

EXAMPLE 3

As a comparative example, two solutions of an alkyl substituted monohydric phenol, 2,6-ditertiarybutyl-4-methyl phenol, are prepared using methoxyethanol as the solvent. One solution was inhibited with 100 ppm of citric acid, and one contained no citric acid. The solutions are stored for 8 days at 110°F. Although neither sample developed undesirable color, the sample containing the citric acid is somewhat hazy.

The invention has been described in considerable detail with particular reference to certain preferred embodiments thereof, but it will be understood that variations and modifications can be effected within the spirit and scope of the invention.

I claim:

1. The method of stabilizing hydroquinone solutions comprising hydroquinone and a solvent therefor, said solvent being substantially free from impurities, against the formation of undesirable color and odor during storage which comprises adding to said solution from about 0.0025 percent to about 1 percent by weight of the solution of citric acid.

2. The method according to claim 1 which comprises adding to said solution between about 0.005 percent and about 0.05 percent by weight of the solution of citric acid.

3. The method of stabilizing solutions consisting essentially of hydroquinone and a solvent therefor selected from the group consisting of ethylene glycol, diethylene glycol and methoxyethanol against the formation of undesirable color and odor during storage which comprises adding to said solution from about 0.0025 percent to about 1 percent by weight of the solution of citric acid.

4. The method according to claim 3 which comprises adding to said solution between about 0.005 percent and about 0.05 percent, by weights of the solution, of citric acid.

5. The method of stabilizing hydroquinone solutions consisting essentially of hydroquinone and methoxyethanol against the formation of undesirable color and odor during storage which comprises adding to said solution from about 0.0025 percent to about 1 percent by weight of the solution of citric acid.

* * * * *